United States Patent
Weis et al.

(10) Patent No.: US 9,305,179 B2
(45) Date of Patent: Apr. 5, 2016

(54) SYSTEMS AND METHODS FOR REDUCING ACCURACY OF WEB BUGS

(71) Applicant: GOOGLE INC., Mountain View, CA (US)

(72) Inventors: Daniel Weis, San Francisco, CA (US); Thompson Alexander Ivor Gawley, Palo Alto, CA (US)

(73) Assignee: Google Inc., Mountain View, CA (US)

(*) Notice: Subject to any disclaimer, the term of this patent is extended or adjusted under 35 U.S.C. 154(b) by 71 days.

(21) Appl. No.: 14/340,371

(22) Filed: Jul. 24, 2014

(65) Prior Publication Data
US 2016/0026822 A1  Jan. 28, 2016

(51) Int. Cl.
G06F 21/00 (2013.01)
G06F 21/62 (2013.01)
H04L 29/08 (2006.01)
H04L 12/58 (2006.01)

(52) U.S. Cl.
CPC ............ *G06F 21/6245* (2013.01); *H04L 51/34* (2013.01); *H04L 67/10* (2013.01); *H04L 67/22* (2013.01)

(58) Field of Classification Search
CPC ..... G06F 21/6245; H04L 51/34; H04L 67/10; H04L 67/22
See application file for complete search history.

(56) References Cited

U.S. PATENT DOCUMENTS 8,135,610 B1    3/2012 Bryce et al.
2011/0191664 A1*  8/2011 Sheleheda et al. .... G06F 15/173
                                                        715/205

OTHER PUBLICATIONS

Wikipedia, "Web Bug" http://en.wikipedia.org/wiki/Web_bug Feb. 13, 2014, 6 pgs.
Smith, "The Web Bug FAQ" https://w2.eff.org/Privacy/Marketing/web_bug.html , Nov. 11, 2009, 4 pgs.
How to defeat web bug tracking in email., http://www.netwalk.com/techweb/defeatwebbug.html downloaded May 9, 2014, 1 pg.
Felten, "Email Tracking: It Gets Worse" https://freedom-to-tinker.com/blog/felten/email-tracking-it-gets-worse/ May 25, 2004, 5 pgs.

* cited by examiner

*Primary Examiner* — William Goodchild
(74) *Attorney, Agent, or Firm* — Morgan, Lewis & Bockius LLP

(57) ABSTRACT

Systems and methods for reducing accuracy of web bugs are disclosed. In some implementations, a method includes, at a computing device, identifying an incoming electronic message addressed to an intended recipient. The incoming electronic message includes a plurality of content items provided by a content provider. The method also includes, before the intended recipient reviews the incoming electronic message, reducing accuracy of user activity tracking by the content provider, by: requesting on a modeled temporal basis, a download of a first media content item in the plurality of media content items. In some implementations, the first media content item is invisible to the intended recipient.

20 Claims, 5 Drawing Sheets

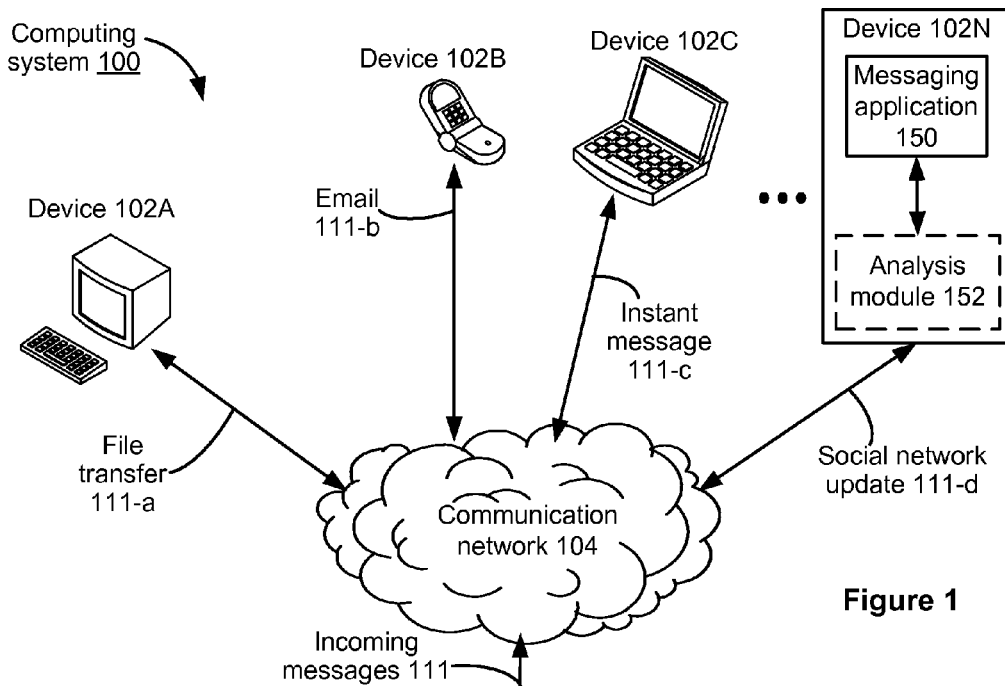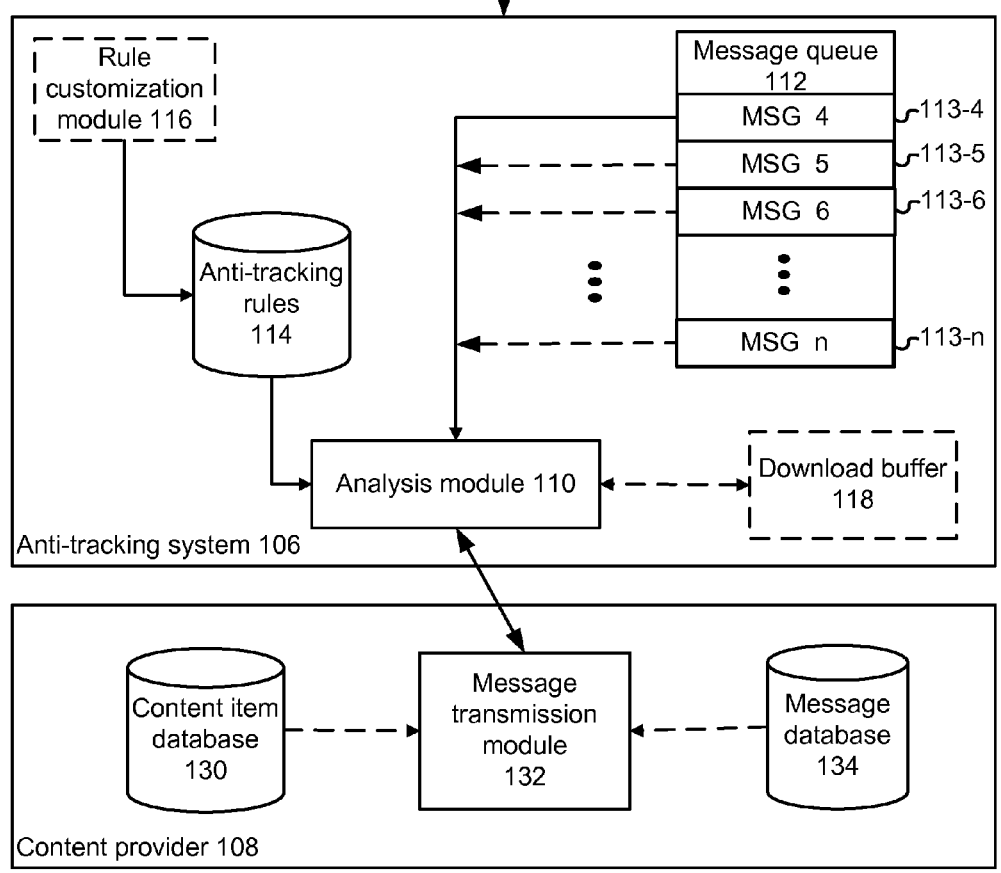
Figure 1

SYSTEMS AND METHODS FOR REDUCING ACCURACY OF WEB BUGS

TECHNICAL FIELD

The implementations disclosed herein relate generally to reducing accuracy of web bugs.

BACKGROUND

Nowadays, a user on average receives hundreds, if not thousands, of electronic messages each week. User interaction with any of these message may be tracked through web bugs and their patterns determined by analyzing how users handle (e.g., review repeated or delete without viewing) content items within the electronic messages.

For example, a promotional email may contain content elements that the intended recipient is not made aware of (e.g., invisible icons); and the user's activity with respect to the email may be tracked and user interests in the content of the email gauged—unbeknownst to the user—by tracking how frequently or recently the user downloads these content elements, on the basis that such downloads is highly suggestive of user interests (or lack thereof) in the promotion email's content.

These techniques, while useful to content providers, sometimes intrude on user privacy. Difficulties abound, however, in protecting user privacy in the face of web bugs. One technical problem is that it may not be possible or desirable to block out all (e.g., suspicious) content elements within a message (e.g., an e-mail message). For example, a wedding invitation email with an engagement photo embedded therein may lose its full meaning if the photo is not displayed contemporaneously with the email.

Technical solutions (e.g., computing systems, methods, and non-transitory computer readable storage mediums) for reducing or eliminating the above identified technical problems are provided in the present disclosure.

BRIEF DESCRIPTION OF THE DRAWINGS

The implementations disclosed herein are illustrated by way of examples, and not by way of limitations, in the accompanying drawings. Like reference numerals refer to corresponding parts throughout the drawings.

FIG. 1 is an example block diagram illustrating a computing system, in accordance with some implementations.

SUMMARY

Figure 2:
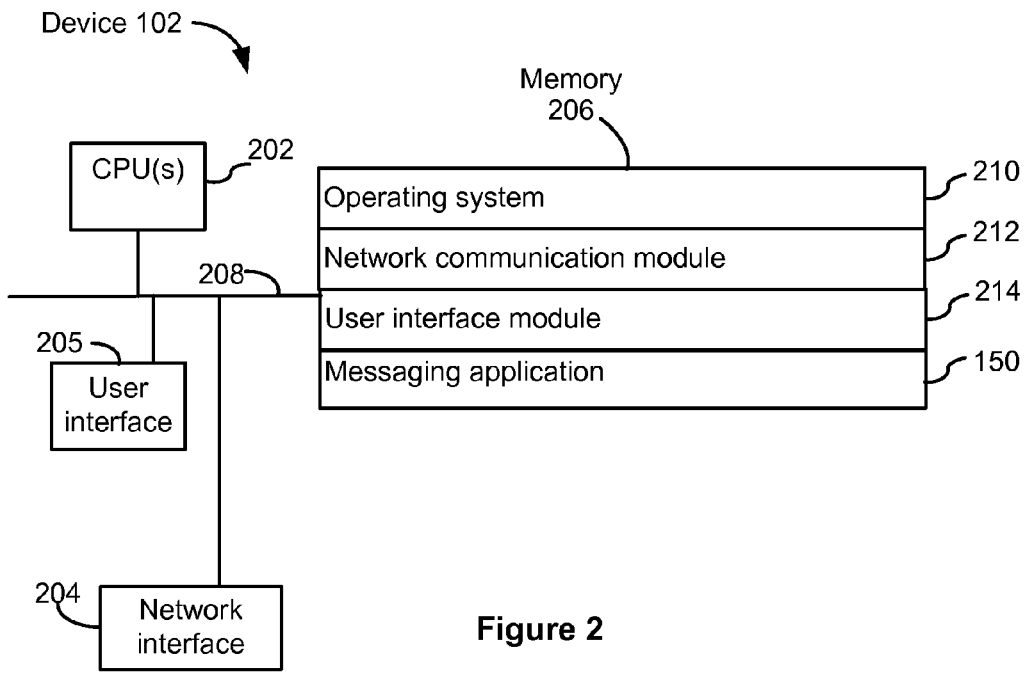
FIG. 2 is an example block diagram illustrating a computing device, in accordance with some implementations.

Technical solutions (e.g., computing systems, methods, and non-transitory computer readable storage mediums) for clustering electronic messages are provided in the present application.

In some implementations, a method is provided, at a computing device having one or more processors and memory storing one or more programs for execution by the one or more processors, in which an incoming electronic message addressed to an intended recipient, is identified. The incoming electronic message includes a plurality of content items collectively fetched from one or more remote content providers. In such instance, accuracy of user activity tracking is reduced by requesting, on a modeled temporal basis, a download of a first content item in the plurality of content items. In some embodiments, the first content item is invisible to the intended recipient when the electronic message is displayed to the intended recipient. In some embodiments, the first content item is visible to the intended recipient when the electronic message is displayed to the intended recipient. In some embodiments, the intended recipient is enabled to expressly request download of content items in the plurality of content items at a time when the electronic message is displayed to the intended recipient. In some embodiments, the intended recipient is barred from explicitly requesting download of content items in the plurality of media content items at a time when the electronic message is displayed to the intended recipient.

In some embodiments, the user activity tracking is carried out by a remote content provider in the one or more remote content providers. In some embodiments, the user activity tracking is carried out by a party other than the remote content provider. In some embodiments, the download of the first content item occurs at a time before the intended recipient reviews the incoming electronic message. In some embodiments, the download of the first content item occurs at a time after the intended recipient reviews the incoming electronic message. In some embodiments, the first content item is one of: a video clip, a photo file, an audio file, or a document. In some embodiments, the plurality of content items identifies two or more different types of user activities.

In some embodiments, the modeled temporal basis mimics, to a predefined degree, activities by a human user. In some embodiments, the plurality of content items is fetched from the remote content provider automatically without user intervention. In some embodiments, the modeled temporal basis is selected in accordance with one or more characteristics associated with the intended recipient. In some embodiments, the modeled temporal basis is selected in accordance with one or more characteristics associated with the remote content provider. In some embodiments, the modeled temporal basis is selected in accordance with one or more characteristics associated with the incoming electronic message. In some embodiments, the modeled temporal basis is selected in accordance with one or more characteristics associated with the computing device. In some embodiments, the modeled temporal basis is selected in accordance with one or more characteristics associated with the first media content item.

Another aspect of the present disclosure provides a computing system, comprising one or more processors, memory, and one or more programs. The one or more programs are stored in the memory and configured to be executed by the one or more processors. The one or more programs including instructions for identifying an incoming electronic message addressed to an intended recipient. The incoming electronic message includes a plurality of content items collectively fetched from one or more remote content providers. Responsive to the identifying accuracy of user activity tracking is reduced by requesting, on a modeled temporal basis, a download of a content item in the plurality of content items.

Another aspect of the present disclosure provides a non-transitory computer readable storage medium storing one or more programs. The one or more programs comprise instructions, which when executed by a computing system with one or more processors, cause the computing system to execute a method of identifying an incoming electronic message addressed to an intended recipient, where the incoming electronic message includes a plurality of content items collectively fetched from one or more remote content providers. In the method, responsive to the identification, accuracy of user activity tracking is reduced by requesting, on a modeled temporal basis, a download of a content item in the plurality of content items.

DETAILED DESCRIPTION

The implementations described herein provide various technical solutions to defeat user activity tracking, and in particular to the above-identified problems—by requesting on a modeled temporal basis, a download of one or more content items within an electronic message.

As a non-limiting example, after obtaining a string of emails (e.g., MSG 1, MSG 2, and MSG 3) from an un-trusted content provider (e.g., "ADS_SENDER.com"), an anti-tracking system analyzes content of an incoming email (e.g., MSG 1). In some cases, the anti-tracking system determines not only how many small-size images (potential web bugs) are embedded in the email, but also how many of these small-size images are invisible to a user (thereby rendering them highly likely to be web bugs).

After such a determination, the anti-tracking system attempts to reduce accuracy of user activity tracking (through web bugs) by the un-trusted content provider or other parties (e.g., entities that have access to web bugs), by: requesting on a modeled temporal basis, a download of one or more detected small-size invisible images. In some cases, the (e.g., random) download occurs before an intended recipient reviews the email (a feature sometimes called pre-review anti-tracking). In other cases, the download occurs after an intended recipient reviews the email (a feature sometimes called post-review anti-tracking). In either case, because the download of small-size invisible images (that are highly likely to be web bugs) are initiated by the anti-tracking system, rather than by (and sometimes even unbeknownst to) the intended recipient, the un-trusted content provider could not accurately track user activity with respect to the email or determine user interests in the content of the email.

Additional details of implementations are now described in relation to the Figures.

FIG. 1 is a block diagram illustrating a computing system 100, in accordance with some implementations.

In some implementations, the computing system 100 includes one or more devices 102 (e.g., device 102A, 102B, 102C, . . . , and 102N), a communication network 104, an anti-tracking system 106, and one or more content providers 108 (e.g., an online photo service, a streaming media service, a file storage service, or an email provider).

In some implementations, one or more content providers 108 provides content items, such as email, photos, streaming media content, videos, and files. In some implementations, the content items include media content items. In some implementations, a content item includes one or more web bugs, e.g., an HTML page that includes one or more invisible images, the download of which can be tracked and analyzed to determine user activity patterns. For example, if a user always accesses emails late at night, it may be determined that the user works on night shifts and thus promotional items, such as energy drink ads, may be offered to the user.

In some implementations, a content provider 108 includes a content item database 130, a message transmission module 132, and a message database 134. In some implementations, the content item database 130 includes one or more content items for distribution to an intended recipient, e.g., by way of embedded images within an email, invisible tags within a video clip, or the like. In some implementations, the content item database 130 includes one or more content items, such as an audio/video file, a photo, or a streaming video.

In some implementations, the message transmission module 132 transmits electronic messages, with or without web bugs, to one or more users, e.g., through the anti-tracking system 106.

In some implementations, the message database 134 provides to the message transmission module 132 one or more electronic messages (e.g., emails and instant messages) for transmission to one or more users.

In some implementations, an electronic message is a file transfer 111-*a* (e.g., an HTML document), an email 111-*b*, an instant message 111-*c*, or a social network update 111-*d*.

In some implementations, the anti-tracking system 106, after receiving an electronic message, downloads (without user intervention and typically without user awareness), content items in the electronic message. In some implementations, this is done to mimic actions a human user would take such that a user activity tracker cannot tell whether an action is carried out by a human user or by the anti-tracking system, thereby rendering user activity tracking (e.g., through using web bugs) inaccurate and therefore irrelevant. Such basis is termed herein as a modeled temporal basis. For example, if an anti-tracking system downloaded on a daily basis all images, some of which function as web bugs, within emails a user received in the past week, this download activity may be tracked and (mistakenly) understood by a promotional email sender as the user being extremely interested in the content of those emails, even though the user may not be remotely interested. Such daily downloads, which is one form of modeled temporal basis, leads to mistaken beliefs by the promotional email sender and in some cases renders their analysis of user activity and subsequent conclusions inaccurate, thereby defeating the purpose of planting web bugs, and similar future use of web bugs. This has the long term effect of reducing web bugs and the concomitant invasion of privacy that is typically associated with such web bugs.

In some implementations, the anti-tracking system 106 includes an analysis module 110, a message queue 112, a collection of anti-tracking rules 114 (e.g., user- or system-provided rules), optionally a rule customization module 116, and optionally a download buffer 118.

In some implementations, the analysis module 110 analyzes (e.g., content of) an electronic message against rules. For example, the analysis module 110 conducts a keyword search (e.g., a search of the term "deal" or the phrase "low price") within various content components (e.g., message body, subject line, sender/recipient, and header section) of an electronic message, and then analyzes search results using content-based clustering rules (e.g., whether the term "deal" appears more than 3 times within the body of an email, or whether the phrase "low price" appears within the subject line of a fax message). In another example, the analysis module 110 scans all text or non-text elements of electronic messages to determine how many invisible images are embedded in the electronic messages. This is because, in some cases, a larger number of invisible small-size images embedded in an electronic message is indicative of the presence of web bugs in the electronic message. In some implementations, based on the analysis results, the analysis module 110 determines whether web bugs are present in the electronic message.

In some implementations, the analysis module 110 is a software or hardware component resident in the anti-tracking system 106 (or the device 102), such as a software package/application or a hardware chipset, for processing messages. In other implementations, the analysis module 110 is a separate or independent from the anti-tracking system 106 (or the device 102) (e.g., a mail server).

Figure 4:
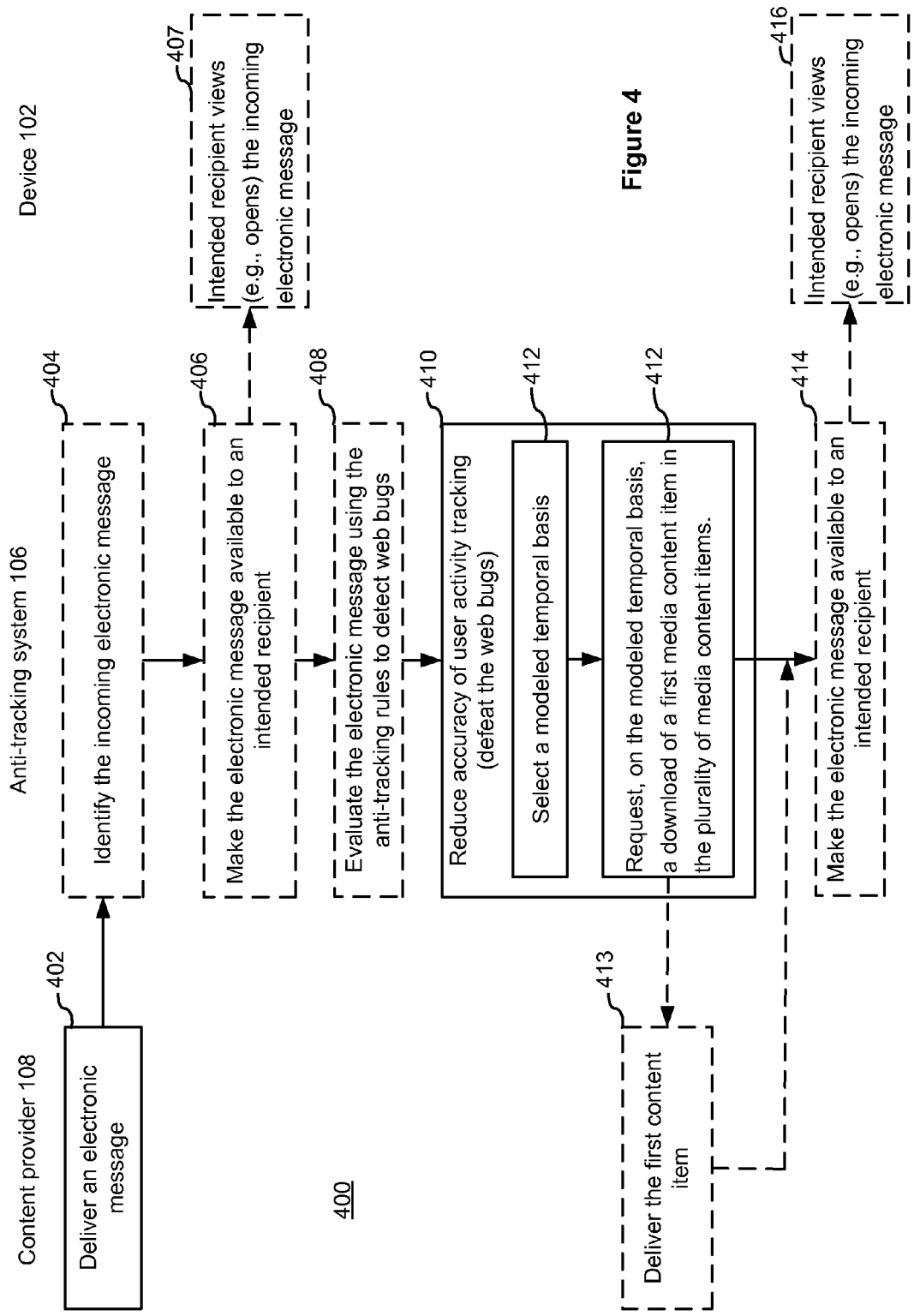
FIG. 4 is an example flow chart illustrating a method for reducing accuracy of web bugs in a computing system, in accordance with some implementations.

In some implementations, the message queue 112 stores one or more electronic messages awaiting analysis by the analysis module 110, such as MSG 4, MSG 5, MSG 6, . . . and MSG n (FIG. 1, 113-4 . . . 113-n). In some implementations, the message queue 112 includes different types of electronic messages, such as a file transfer 111-a (e.g., an HTML document), an email 111-b, an instant message 111-c, or a social network update 111-d.

In some implementations, the communication network 104 interconnects one or more devices 102 with each other, and with the anti-tracking system 106. In some implementations, the communication network 104 optionally includes the Internet, one or more local area networks (LANs), one or more wide area networks (WANs), other types of networks, or a combination of such networks.

FIG. 2 is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the device 102 with other devices (e.g., the anti-tracking system 106 and the devices 102B . . . 102N) via one or more network interfaces 204 (wired or wireless), or the communication network 104 (FIG. 1);
- a user interface module 214 for displaying user interface components or controls (e.g., textbox, button, radio button, drop-down list) to a user; and
- a messaging application 150 for processing and displaying incoming and outgoing electronic messages.

In some implementations, the user interface 205 includes an input device (e.g., a keyboard, a mouse, a touchpad, a track pad, and a touch screen) for a user to interact with the device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
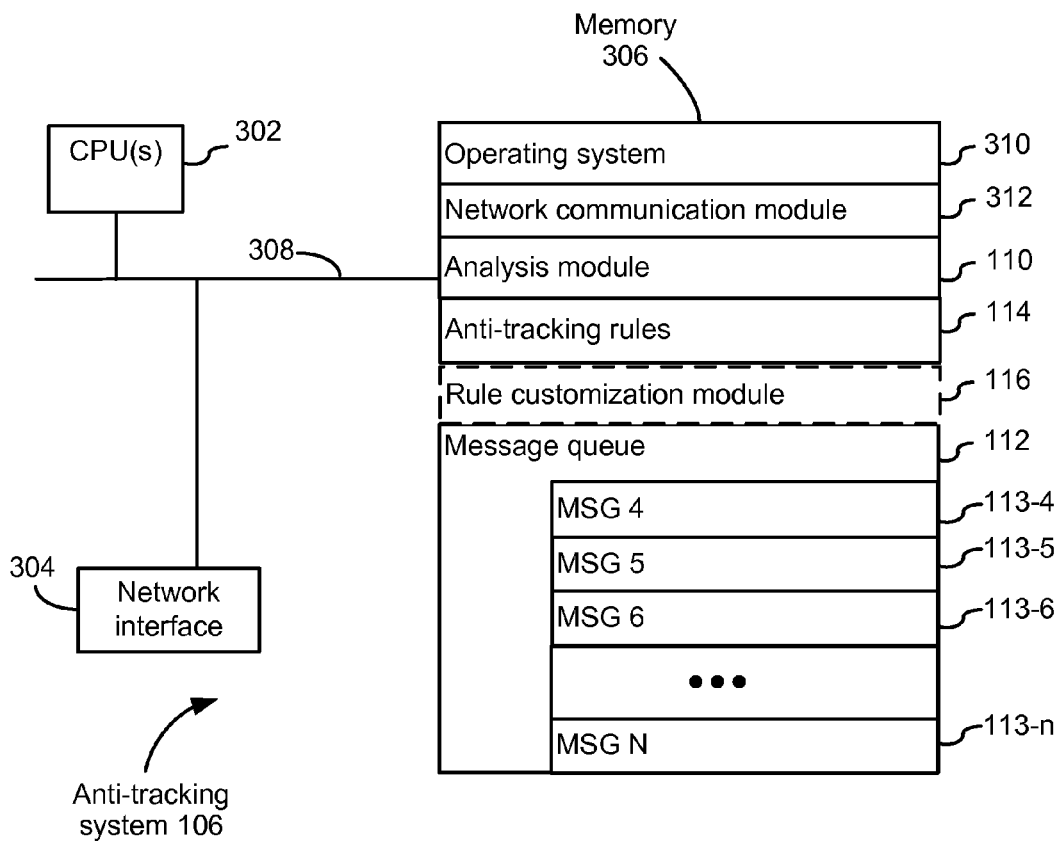
FIG. 3 is an example block diagram illustrating an anti-tracking system, in accordance with some implementations.

FIG. 3 is a block diagram illustrating an anti-tracking system 106, in accordance with some implementations. The anti-tracking system 106 typically includes one or more processing units CPU(s) 302 (also referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the anti-tracking system 106 with other devices (e.g., the devices 102) via the one or more network interfaces 304 (wired or wireless), or the communication network 104 (FIG. 1);
- an analysis module 110 for analyzing content of electronic messages (e.g., incoming and outgoing) to determine the likelihood that such messages include one or more web bugs;
- a message queue 112 for storing electronic messages awaiting processing by the analysis module 110, e.g., MSG 4, MSG 5, MSG 6, . . . and MSG n (113-4 . . . 113-n);
- a collection of anti-tracking rules 114, which are used by the analysis module 110 to determine, e.g., with a predefined degree of certainty, one or more electronic messages that should be subject to the disclosed anti-tracking activity; and
- optionally a rule customization module 116 for enabling the customization of the disclosed anti-tracking rules or their application thereof (e.g., aggressive, moderate, light, or no monitoring)

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 may store additional modules and data structures not described above.

Although FIGS. 2 and 3 show a "device 102" and a "anti-tracking system 106," respectively, FIGS. 2 and 3 are intended more as functional description of the various features which may be present in computer systems than as a structural schematic of the implementations described herein. In practice, and as recognized by those of ordinary skill in the art, items shown separately could be combined and some items could be separated.

FIG. 4 is a flow chart illustrating a method for monitoring electronic messages in a computing system, e.g., implemented at device 102 and/or at the anti-tracking system 106, in accordance with some implementations.

In some implementations, the device 102A sends (402) a first electronic message to the device 102B, via the anti-tracking system 106.

In some implementations, after identifying the incoming electronic message (404), the incoming electronic message is optionally made available to an intended recipient (406). If the message is made available, thereafter, the intended recipient is free to view the incoming electronic message (407). In some embodiments, the message is not made available until after the message has been evaluated against anti-tracking rules and possibility subjected to the anti-web bug algorithms provided by the instance disclosure.

In some implementations, the anti-tracking system 106 determines (408) whether the first message satisfies, e.g., to a predefined threshold degree, one or more anti-tracking rules 114. In some implementations, such a determination is made by another computing device, such as a remote mail server or a dedicated computing server. In some implementations, such anti-tracking rules 114 are satisfied when the electronic message includes one or more content items that must be fetched from one or more remote content providers in order to render the message. That is, all electronic messages that include links to content outside the electronic messages themselves would sufficiently satisfy one or more of the anti-tracking rules and therefore cause such messages to be subjected to the disclosed web-bug amelioration algorithms disclosed herein, in some embodiments.

As discussed above, when one or more of the anti-tracking rules are satisfied, a program of reducing the accuracy of such web bugs commences. For instance, in some implementations, responsive to a determination that an incoming electronic message satisfies one or more anti-tracking rules, the anti-tracking system 106 selects a modeled temporal basis by which to make requests for content items in the message (412). That is, system 106 determines an order and timing of when it will make request to download the various content items within the message. Consider, for example, the case in which the message includes three content items. In some embodiments, the modeled temporal basis dictates that these three content items are downloaded in rapid succession on a periodic basis (e.g. every five minutes, every hour, once a day). In some embodiments, the modeled temporal basis dictates that a random subset of these three content items be downloaded while the remaining content items are not downloaded. In some embodiments, the modeled temporal basis dictates that the content items be downloaded at a designated time of day as 10 PM PST every day. In some embodiments, the modeled temporal basis may categorize the content items by evaluating the context of the content items around each content item and request downloads of such content items over time as a function of this context. For instance, content items that are within certain HTML tags may be downloaded in accordance with the modeled temporal basis more frequently than content items that are not within certain HTML tags. In some embodiments, the modeled temporal basis dictates that the content items of an electronic message be downloaded on a completely or partial random basis over time. In some embodiments, the modeled temporal basis dictates that the content items of an electronic message be downloaded a predetermined number of times within a predetermined time period, e.g., three times over three days. As noted in FIG. 4, one or more content providers 108, which may be the same content provider that provided the electronic message in the first instance, or other content providers, deliver (413) the requested content item(s) to the anti-tracking system 106 when content requests are made in accordance with the modeled temporal basis. in some embodiments, upon completion, or concurrent to running the requests on the modeled temporal basis, the electronic message is made available to the intended recipient (414) who then may view the incoming electronic message (416).

In some embodiments, only those intended recipients who pay for a service of reducing the accuracy of user activity tracking have their electronic messages analyzed and web bug tracking ameliorated. In some embodiments, the incoming electronic message is addressed to a plurality of recipients and is delivered to such recipients in at block 407 and/or block 416.

Figure 5:
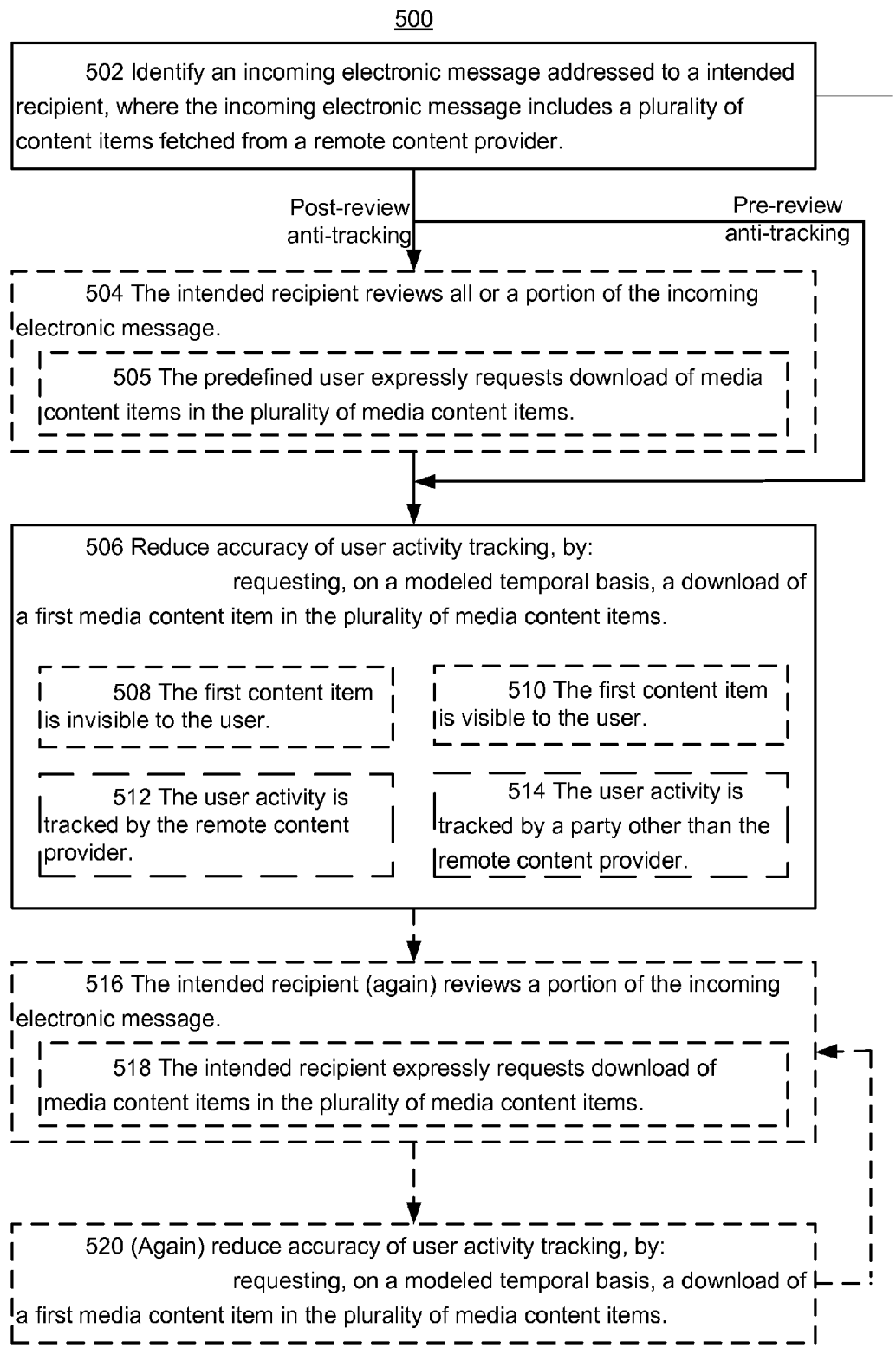
FIG. 5 is an example flow chart illustrating a method for reducing accuracy of web bugs, in accordance with some implementations.

FIG. 5 is an example flow chart illustrating a method for reducing accuracy of web bugs, in accordance with some implementations. In some implementations, the method 500 for reducing accuracy of web bugs is performed at a computing system, e.g., the anti-tracking system 106. In some implementations, the anti-tracking system 106 includes one or more processors and memory storing one or more programs for execution by the one or more processors. In some embodiments, the anti-tracking system 106 encompasses or works in conjunction with a mail server.

In some implementations, an incoming electronic message addressed to one or more intended recipients is identified (502). The incoming electronic message includes one or more of content items fetched from a remote content provider. In embodiments where post-review anti-tracking is performed, process control passes to 504 and an intended recipient reviews all or a portion of the incoming electronic message (502). Moreover, the intended recipient expressly requests the download of content items in a plurality of content items in the incoming electronic message (505). In some embodiments, the intended recipient is enabled to expressly request download of content items in the plurality of content items in the electronic message at a time when the electronic message is displayed to the intended recipient. In some embodiments, the intended recipient is barred from explicitly requesting download of content items in the plurality of media content items at a time when the electronic message is displayed to the intended recipient.

In some embodiments, the above process works the same way even in the instance where the electronic message contains only a single content item that is obtained from a source external to the electronic messages (e.g., electronic messages that contain only a single link).

In post-review tracking embodiments in which the electronic message has been reviewed by the intended recipient and in pre-review anti-tracking embodiments in which the incoming electronic message has been identified, a web bug accuracy program (506) then commences in which there is requested, on a modeled temporal basis, a download of a first media content item in the plurality of media content items within the electronic message. In some embodiments, the first content item is invisible to the intended recipient when the electronic message is displayed to the intended recipient (508). In some embodiments, the first content item is visible to the intended recipient when the electronic message is displayed to the intended recipient (510). In some embodiments, the user activity associated with the electronic message (e.g., the times when content items within the message that must be retrieved from sources external to the message is requested) is tracked by the remove content provider that delivered the electronic message (512). In some embodiments, the user activity associated with the electronic message (e.g., the times when content items within the message that must be retrieved from sources external to the message is requested) is tracked by a party other than the content provider (514).

In some embodiments, the content items that are requested are one of a video clip, a photo file, an audio file, or a document. In some embodiments, the plurality of content items in an electronic message identifies two or more different types of user activities. For instance, in one example, one content item in an electronic message identifies the activity of selection of a news article within the electronic message because the content item is a news article that is fetched by a link in the electronic message to the news article that is initially external to the electronic message whereas another content item in the electronic message identifies the selection of a video because the content item is video that is fetched by a link in the content item to the video that is also initially external to the electronic message.

Examples of modeled temporal basis for requesting the download of content items in electronic messages to reduce the accuracy of user activity tracking have been given above with reference to FIG. 4. In addition to such examples, other examples are provided by the present disclosure. For instance, in some embodiments the modeled temporal basis mimics, to a predefined degree, activities by a human user. In some embodiments, the modeled temporal basis is selected in accordance with one or more characteristics associated with the intended recipient. For example, if the intended recipient is known to access messages during the day, the requests for content items may, in accordance with the modeled temporal basis, occur at night, to make the web bug monitor believe that the intended recipient reviews messages at night. In some embodiments, the modeled temporal basis is selected in accordance with one or more characteristics associated with the remote content provider. For instance, in some embodiments, information on remote content provider is collectively obtained over time, such as the volume or type of content each such content provider communicates to intended recipients and the modeled temporal basis is customized based on the individual characteristics of such content providers. In some embodiments, content providers that are known to breach intended recipient privacy are dealt with by more aggressively under the modeled temporal basis than content providers that more respectful of intended recipient privacy. In some embodiments, the modeled temporal basis is selected in accordance with one or more characteristics associated with the incoming electronic message. For instance, messages that contain certain words such as "advertisement" or "sale" or have many intended recipients may be handled under a modeled temporal basis that is different than a message that is deemed to a personal message from a trusted source.

Upon completion of the accuracy reduction algorithm the intended recipient (again) reviews a portion of the incoming electronic message if the recipient desires (516). Further, the intended recipient is free to expressly requests download of media content items in the plurality of media content items (518). Subsequently, the accuracy of user activity tracking is commenced again by requesting, on a modeled temporal basis, a download of a first media content item in the plurality of media content items (520). FIG. 5 discloses one process flow in which user requests for content items are iteratively masked between sessions 506, 520, etc. in which content requests are performed without user interaction from the intended recipient in accordance under a modeled temporal basis. In fact, in some embodiments, such automated content requests in accordance with the modeled temporal basis run concurrently to the content requests of the intended recipients.

Figure 6:
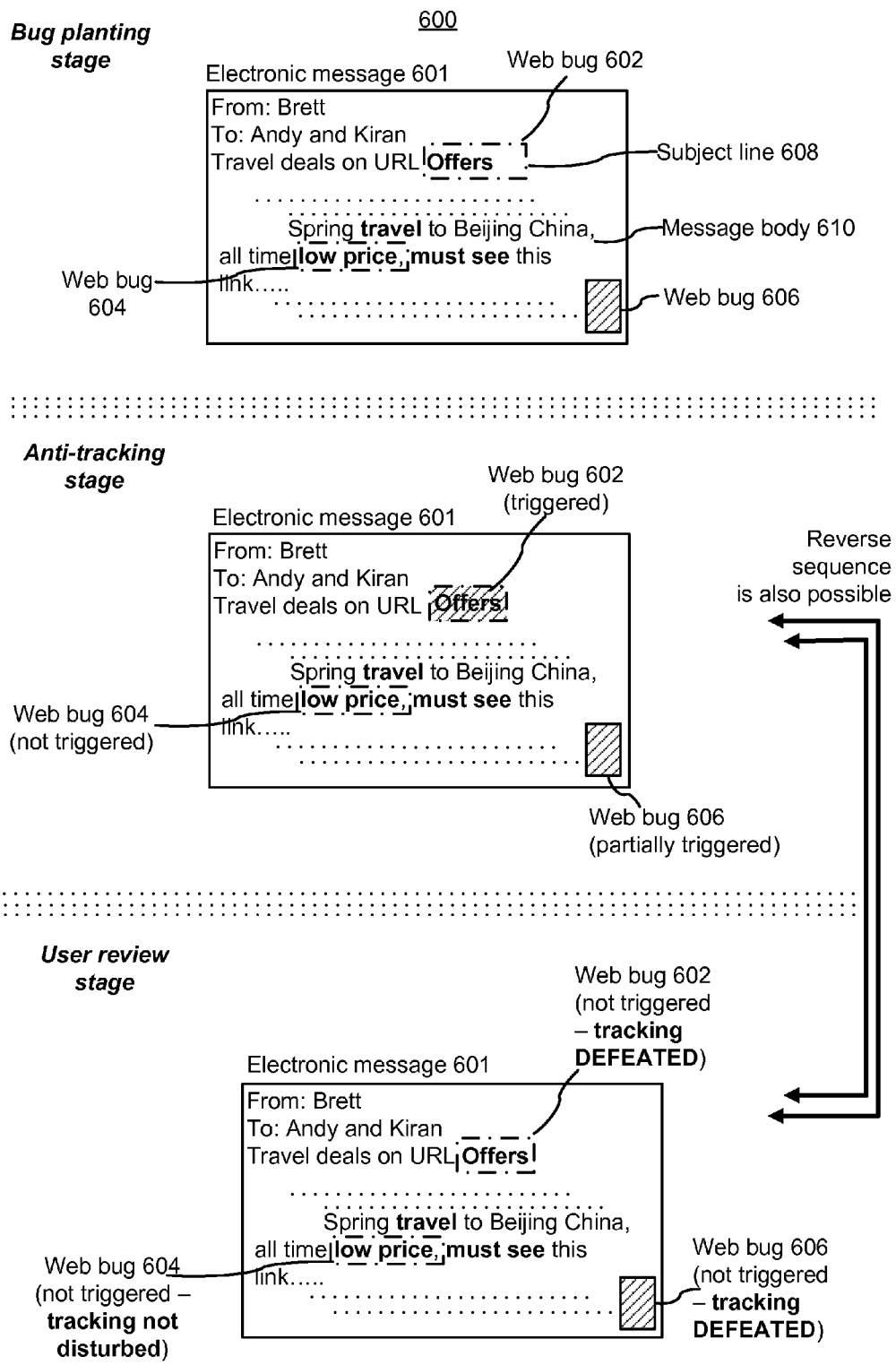
FIG. 6 is an example block diagram illustrating a method for reducing accuracy of web bugs, in accordance with some implementations.

FIG. 6 is an example diagram illustrating a method 600 for reducing the accuracy of web bugs, in accordance with some implementations. As shown in FIG. 6, MSG 1 (601), which concerns "Travel deals on URL Offers," that is sent from Brett to Andy and Kiran. The subject line 608 includes "Travel deals on URL Offers" the message body 610 includes "Spring travel to Beijing China, all time low price, much see this link." In the bug planting stage, web bugs 602, 604 and 606 are planted in the electronic message. For instance, the term "Offers" is associated with web bug 602, the term "low price" is associated with web bug 604, and there is another web bug 606 that is not visible to the user. In the anti-tracking stage the links for web bugs 602, 604 and 606 are used to retrieve content, and the web bugs serve to monitor this activity and thereby determine intended recipients user patterns. However, because the web bugs are triggered in accordance with a modeled temporal basis rather than the intended recipients patterns, the usage data collected by the web bugs no longer accurately reflects user behavior or interests. In the user review stage of FIG. 6, when the user does click on links for content items, the users preferences and behavior with respect to the links for web bugs 602, 604, and 606 can no longer be discerned because there were so many false content item requests made in accordance with the modeled temporal basis during the anti-tracking stage. In other words, the signal provided by the user is lost due to the signal generated by the content requests that were made with user intervention in accordance with the modeled temporal basis.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first media content item could be termed a second media content item, and, similarly, a second media content item could be termed a first media content item, without changing the meaning of the description, so long as all occurrences of the "first media content item" are renamed consistently and all occurrences of the "second media content item" are renamed consistently. The first media content item and the second media content item are both media content items, but they are not the same media content item.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
   at a computing device having one or more processors and memory storing one or more programs for execution by the one or more processors:
      identifying an incoming electronic message addressed to an intended recipient, wherein the incoming electronic message includes a plurality of content items collectively fetched from one or more remote content providers,
      reducing accuracy of user activity tracking, by:
         requesting, on a modeled temporal basis, a download of a first content item in the plurality of content items.

2. The method of claim 1, wherein the first content item is invisible to the intended recipient when the electronic message is displayed to the intended recipient.

3. The method of claim 1, wherein the first content item is visible to the intended recipient when the electronic message is displayed to the intended recipient.

4. The method of claim 1, wherein the intended recipient is enabled to expressly request download of content items in the plurality of content items at a time when the electronic message is displayed to the intended recipient.

5. The method of claim 1, wherein the intended recipient is barred from explicitly requesting download of content items in the plurality of media content items at a time when the electronic message is displayed to the intended recipient.

6. The method of claim 1, wherein the user activity tracking is carried out by a remote content provider in the one or more remote content providers.

7. The method of claim 1, wherein the user activity tracking is carried out by a party other than the remote content provider.

8. The method of claim 1, wherein the download of the first content item occurs at a time before the intended recipient reviews the incoming electronic message.

9. The method of claim 1, wherein the download of the first content item occurs at a time after the intended recipient reviews the incoming electronic message.

10. The method of claim 1, wherein the first content item is one of: a video clip, a photo file, an audio file, or a document.

11. The method of claim 1, wherein the plurality of content items identifies two or more different types of user activities.

12. The method of claim 1, wherein the modeled temporal basis mimics, to a predefined degree, activities by a human user.

13. The method of claim 1, wherein the plurality of content items is fetched from the remote content provider automatically without user intervention.

14. The method of claim 1, wherein the modeled temporal basis is selected in accordance with one or more characteristics associated with the intended recipient.

15. The method of claim 1, wherein the modeled temporal basis is selected in accordance with one or more characteristics associated with the remote content provider.

16. The method of claim 1, wherein the modeled temporal basis is selected in accordance with one or more characteristics associated with the incoming electronic message.

17. The method of claim 1, wherein the modeled temporal basis is selected in accordance with one or more characteristics associated with the computing device.

18. The method of claim 1, wherein the modeled temporal basis is selected in accordance with one or more characteristics associated with the first media content item.

19. A computing system, comprising:
   one or more processors;
   memory; and
   one or more programs, wherein the one or more programs are stored in the memory and configured to be executed by the one or more processors, the one or more programs including instructions for:
      identifying an incoming electronic message addressed to an intended recipient, wherein the incoming electronic message includes a plurality of content items collectively fetched from one or more remote content providers,
      reducing accuracy of user activity tracking, by:
         requesting, on a modeled temporal basis, a download of a first content item in the plurality of content items.

20. A non-transitory computer readable storage medium storing one or more programs, the one or more programs comprising instructions, which when executed by a computing system with one or more processors, cause the computing system to execute a method of:
   identifying an incoming electronic message addressed to an intended recipient, wherein the incoming electronic message includes a plurality of content items collectively fetched from one or more remote content providers,
   reducing accuracy of user activity tracking, by:
      requesting, on a modeled temporal basis, a download of a first content item in the plurality of content items.

* * * * *